United States Patent [19]

Ivy

[11] Patent Number: 5,452,680
[45] Date of Patent: Sep. 26, 1995

[54] GAUGE INDICATOR

[75] Inventor: Donald R. Ivy, Waynesburo, Miss.

[73] Assignee: Sunbeam Corporation, Fort Lauderdale, Fla.

[21] Appl. No.: 113,166

[22] Filed: Aug. 27, 1993

[51] Int. Cl.$^6$ .................................................. G01D 13/00
[52] U.S. Cl. .......................... 116/301; 116/284; 116/285; 116/302; 116/304
[58] Field of Search ..................... 116/301, 284, 116/300, 305, 327, 328, 329, 330, 332, 334, 285, 286, 293, 302, 304, 333, 335; 177/167, 173, 186, 196, 205

[56] References Cited

U.S. PATENT DOCUMENTS

| | | | |
|---|---|---|---|
| 1,982,939 | 12/1934 | Weber | 177/186 X |
| 2,052,238 | 8/1936 | McDonald, Jr. | 116/301 X |
| 3,001,503 | 9/1961 | Hezel | 116/285 |
| 3,337,963 | 8/1967 | Tseitlin et al. | 116/300 X |
| 3,469,645 | 9/1969 | Provi et al. | |
| 3,587,518 | 6/1971 | Hauptman | 116/300 |
| 3,666,031 | 5/1972 | Provi et al. | |
| 3,838,744 | 10/1974 | Tanji et al. | |
| 3,853,191 | 12/1974 | Yamagiwa | |
| 3,927,726 | 12/1975 | Hanado et al. | |
| 3,967,690 | 7/1976 | Northcutt | |
| 4,082,153 | 4/1978 | Provi | |

FOREIGN PATENT DOCUMENTS 2710659  9/1978  Germany ................ 177/177

Primary Examiner—William A. Cuchlinski, Jr.
Assistant Examiner—Willie Morris Worth
Attorney, Agent, or Firm—Michael J. Kline; Darren E. Wolf

[57] ABSTRACT

An indicator for a gauge, such as a floor scale. The indicator includes a semi-circular dial and a two-pronged needle indicator that is free to rotate 360° within the gauge with only one of the two prongs being used at a time.

8 Claims, 1 Drawing Sheet

GAUGE INDICATOR

FIELD OF THE INVENTION

The present invention relates to indicators for gauges, and more particularly relates to indicators for floor scales.

BACKGROUND OF THE INVENTION

Floor scales having spring-based measuring mechanisms are well known and generally include a housing having an upper weighing surface on which a person may stand to assess his or her weight. Such scales may be of the digital type, such as illustrated in U.S. Pat. No. 4,082,153, or may be of the dial and indicator needle type, as illustrated in U.S. Pat. Nos. 3,469,645 and 3,666,031. In the latter type of scale, a dial indicator having a series of numerals and striations, generally corresponding to one pound increments, is used. Such indicators also generally include a needle which rotates and responds to a weight being applied to the scale measuring surface. Alternatively, the dial may rotate and the needle may be stationary.

One of the problems associated with dial-type scales relates to their readability. In order to allow the full range of weights (typically 0 to 300 pounds) to be measured, it is often necessary to utilize relatively small numbers and striations when a fixed dial is used. This problem can be somewhat alleviated by using a circular dial that rotates, allowing a full 360° sweep. Such dials, however, often experience "wavering" for significant periods of time before the true weight is indicated.

Accordingly, an advance in the art could be realized if an improved indicator for a dial-type gauge or floor scale could be developed.

SUMMARY OF THE INVENTION

The present invention satisfies the aforedescribed needs by providing a gauge comprising a semi-circular dial having an inner and outer row of numbers and an indicator needle having two ends, one end which is adapted to indicate a reading on the inner row of numbers and the other end adapted to indicate a reading on the outer row of numbers. The indicator needle has a long and short end, preferably disposed 180° relative to each other. The long end indicates the measurements on the outer row of numbers while the short end indicates the measurements on the inner row of numbers. In a highly preferred embodiment of the invention, the inner row of numbers are a different color from the outer row of numbers and the ends of the needle indicator are colored to correspond with their respective row of numbers.

These and other features of the preferred embodiments of the invention will become more readily apparent as the following detailed description proceeds, particularly with reference to the figures included herewith.

DETAILED DESCRIPTION OF THE PREFERRED EMBODIMENTS

Figure 1:
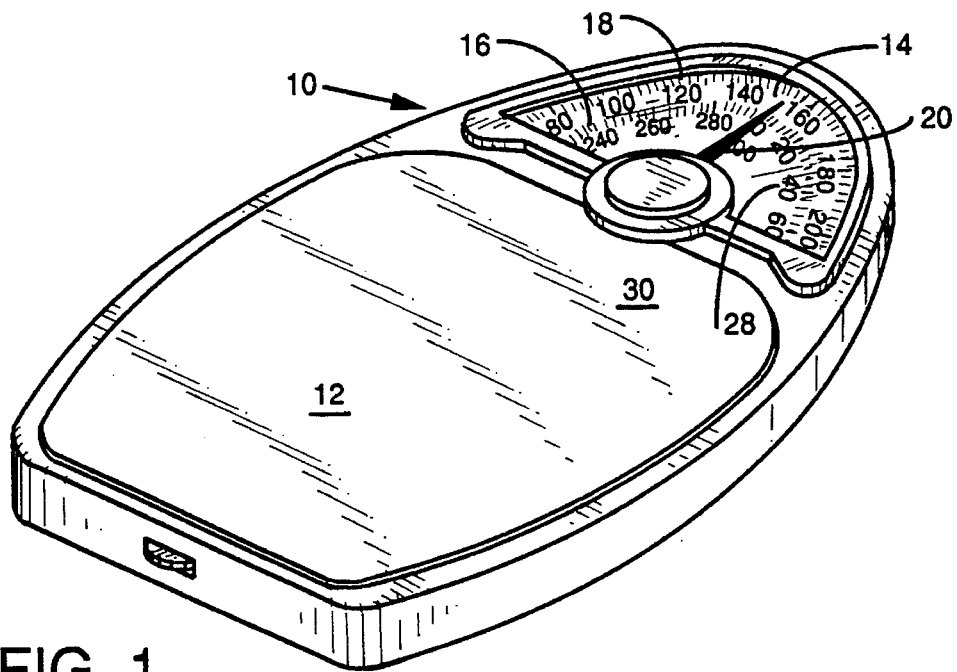
FIG. 1 is an isometric view of a preferred embodiment of the invention.

Referring now to FIG. 1 there is illustrated an improved gauge, which may comprise a floor scale, generally 10, having a platform 12, upon which a user of the device may stand in order to measure his or her weight. The scale further includes a semicircular dial 14, having an inner and outer row of numbers 16 and 18, respectively. These numbers are, as illustrated, separated by striations corresponding to a unit of measure such as pounds.

Except for the improved indicator as will subsequently be described, the internal mechanisms of the gauge or scale may be conventional, and comprise no part of the present invention.

As illustrated, one row of numbers forms a continuous progression of measurements with the other row of numbers. In the embodiment illustrated in FIG. 1 for example, the dial indication for zero appears on the inner row of numbers 90° along the arc comprising the semi-circular inner row of numbers. These numbers progress to "75" along the inner row of numbers, at which point the outer row of numbers continues with "75 to "225." The inner row of numbers continues from "225" to "300."

Figure 2:
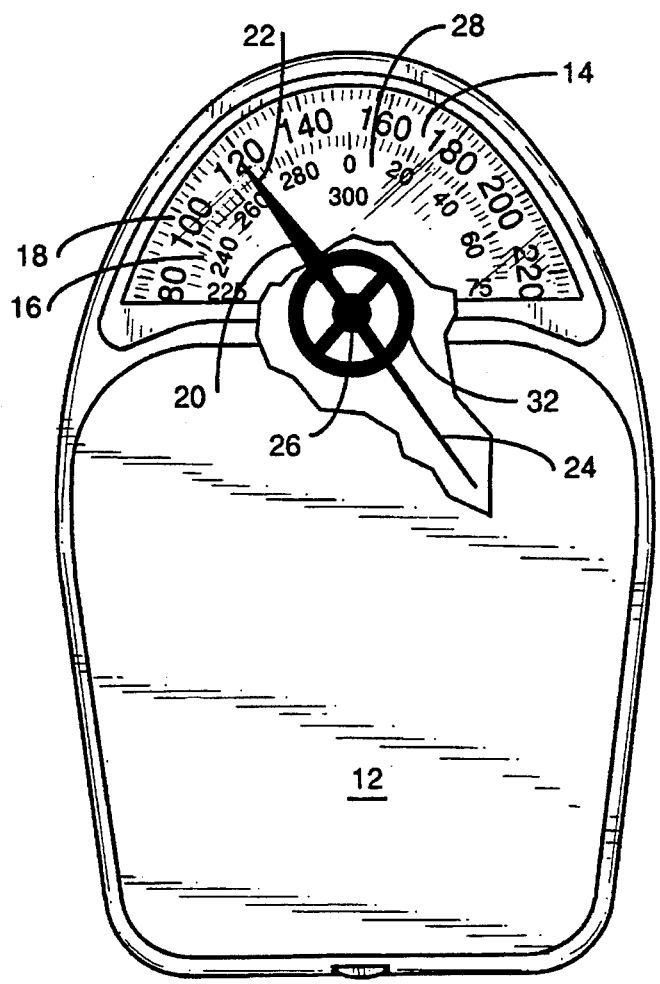
FIG. 2 is a top plan view, partially broken away, of the embodiment of FIG. 1.

FIG. 2 illustrates the dial 14 of FIG. 1 with the housing partially broken away to reveal the indicator 20, which preferably comprises a dual needle having a long end 22 and a short end 24 as illustrated. The long end 22 has a length corresponding to the outer row of numbers 18 and the short end 24 has a length corresponding to the inner row of numbers 16.

Preferably, the needle 20 is rotatably mounted on a spring mechanism at an axis point 26 and the long end 22 and short end 24 are disposed 180° relative to each other as illustrated.

In operation, as an external stimulus is placed on the gauge, such as, in the case of a scale, a person standing on the platform 12, the needle 20 displaces from the rest or zero position and begins to rotate, for example in a clockwise direction, until it comes to rest at an indicator position. Generally, only one end, 22 or 24, of the dual needle 20 will be visible through a window 28 in the scale of 10, except in the situation where the individual's weight exactly corresponds with,, in this embodiment, a 75-pound or 225-pound reading, wherein both ends of the needle will be visible and the reading may be made from either side of the dial. Depending on the weight of the individual, as the needle rotates, one end of the needle 20 will be hidden from view by a portion of the scale housing, generally 30. Of course, the needle is free to rotate 360° within the scale 10. In order for this to be achieved it is necessary for there to be sufficient clearance for both the long end 22 and short end 24 of the needle 20 to rotate within the scale 10.

In a most highly preferred embodiment of the invention the outer row of numbers 18 is a different color from the inner row of numbers 16 and the two ends of the needle are of a color corresponding to the respective row of numbers for which that needle end is adapted to indicate a reading. For example, if the inner row of numbers 16 is red, the short end 24 of the needle 20 is also preferably red. If the outer row of numbers is black, the long end 22 of needle 20 is also preferably black. Other variations are of course possible, as will now be readily apparent to those of ordinary skill in the art.

The needle 20 preferably further includes a reinforcing ring 32 which assists in reinforcing the needle 20 and in facilitating the otherwise cumbersome fabrication of the dial and needle assembly. The needle 20 preferably rides on a pin or other axle (not shown) known to those of ordinary skill in the art.

Although the present invention has been described herein with reference to scales, such as bathroom floor scales, it will now be appreciated that the indicator of the present invention could likewise be employed with other gauges, including by way of example but not limitation, pressure regulators and monitors, temperature indicators, humidity indicators, and any other type of gauge having a circular dial which may be made semi-circular.

Although the invention has been described in detail in the foregoing for the purpose of illustration, it is to be understood that such detail is solely for that purpose and that variations can be made therein by those of ordinary skill in the art without departing from the spirit and scope of the invention as defined by the claims. It is specifically intended that any such variations are intended to be embraced by the following claims and all equivalents thereof.

I claim:

1. A weighing scale having means for rotating an indicator more than 180 degrees, comprising:
   (a) a semi-circular dial positioned for cooperating with said indicator, said dial having an inner row and an outer row of weight indicia;
   (b) said indicator having a first end and a second end, said first end having means to indicate a reading on said inner row of weight indicia, said second end having means to indicate a reading on said outer row of weight indicia, wherein said dial and said indicator cooperate to indicate the weight of objects on said scale.

2. The weighing scale as recited in claim 1, wherein:
   (a) the outer row of weight indicia is a different color from the inner row of weight indicia; and
   (b) the means to indicate a reading on the outer row of weight indicia comprises said second end being the same color as the outer row of weight indicia, and the means to indicate a reading on the inner row of weight indicia comprises said first end being the same color as the inner row of weight indicia.

3. The weighing scale as recited in claim 2, wherein the outer row of weight indicia is black and the inner row of weight indicia is red.

4. The weighing scale of claim 1, wherein said weighing scale comprises a floor scale.

5. The weighing scale of claim 1, wherein said indicator comprises a needle having a long end as said means to indicate a reading on said outer row of weight indicia and a short end as said means to indicate a reading on said inner row of weight indicia.

6. The weighing scale of claim 5, wherein said needle short end is disposed 180 degrees relative to said needle long end.

7. The weighing scale of claim 6, further including blind means for hiding one of said long and short ends from view while a second of said long and short ends of said needle indicates a reading on said dial.

8. The weighing scale of claim 1, wherein each of said inner row of weight indicia and said outer row of weight indicia comprises a series of numbers having striations therebetween.

* * * * *